United States Patent [19]

Kalnitsky et al.

[11] Patent Number: 5,035,916
[45] Date of Patent: Jul. 30, 1991

[54] OPTICAL WAVEGUIDE AND METHOD FOR ITS MANUFACTURE

[75] Inventors: Alexander Kalnitsky; Joseph P. Ellul; Albert R. Boothroyd, all of Nepean, Canada

[73] Assignee: Northern Telecom Limited, Montreal, Canada

[21] Appl. No.: 501,990

[22] Filed: Mar. 28, 1990

Related U.S. Application Data

[62] Division of Ser. No. 363,006, Jun. 8, 1989, Pat. No. 4,934,774.

[51] Int. Cl.$^5$ ............... C23C 14/04; C23C 14/14; C23C 14/18; C23C 14/48
[52] U.S. Cl. ............... 427/38; 427/162; 427/272; 427/372.2; 427/397.7
[58] Field of Search ............... 428/446; 350/96.12, 350/96.13, 96.14, 96.24, 96.3, 96.31, 96.34; 427/38, 43.1, 163, 272

[56] References Cited

U.S. PATENT DOCUMENTS

| | | | |
|---|---|---|---|
| 4,521,443 | 6/1985 | Nalk | 427/38 |
| 4,585,299 | 4/1986 | Strain | |
| 4,715,672 | 12/1987 | Duguay | |
| 4,849,248 | 7/1989 | Hashimoto | 427/38 |

OTHER PUBLICATIONS

"Si-Based Integrated Optics Technologies", Solid State Technology, Feb. 1989-S. Valette et al.
"Optical Interconnections Using Silica-Based Waveguide on Si Substrate", SPIE vol. 991, Fiber Optic Datacom and Computer Networks (1988)-Y. Yamada et al.
"Integrated Optical Devices Based on Silica Waveguide Technologies", SPIE vol. 993, Integrated Optical Circuit Engineering VI (1988)-T. Miyashita et al.
"This Polyimide Could Give Optoelectronics A Push", Electronics, Sep. 3, 1987-W. R. Iversen.
"Optical Interconnections for VLSI Systems", Proceedings of IEEE, vol. 72, No. 7, Jul. 1984-Goodman et al.
"Polymer Optical Circuits for Multimode Optical Fiber Systems", Applied Optics, vol. 19, No. 18, Sep. 15, 1980-Kurokawa et al.
"Dielectric Function of Si-SiO$_2$ and Si-Si$_3$N$_4$ Mixtures", J. Appl. Phys. 50(7), Jul. 1979-D. E. Aspnes et al.
"Refractive Index Variations in Proton-Bombarded Fused Silica", Applied Physics Letters, vol. 24, No. 10, May 15, 1974-Presby et al.
"Compaction of Ion-Implanted Fused Silica", Journal of Applied Physics, vol. 45, No. 1, Jan. 1974-E. EerNisse.
"Optical Properties of Non-Crystalline Si, SiO, SiO$_x$ and SiO$_2$", J. Phys. Chem. Solids, Pergamon Press 1987, vol. 32, pp. 1935-1945, Sep. 1970-H. R. Philipp.

Primary Examiner—Shrive Beck
Assistant Examiner—Margaret Burke
Attorney, Agent, or Firm—C. W. Junkin

[57] ABSTRACT

An optical waveguide is made by forming a layer of SiO$_2$ on a substrate and implanting a region of the SiO$_2$ layer with Si ions to define a region containing a stoichiometric excess of Si which defines a region having an elevated refractive index surrounded by a region having a lower refractive index. The resulting optical waveguide is stable at the high temperatures required for many semiconductor processing methods, and is useful for optical interconnection in integrated optical and optoelectronic devices.

11 Claims, 3 Drawing Sheets

OPTICAL WAVEGUIDE AND METHOD FOR ITS MANUFACTURE

This is a divisional of Ser. No. 07/363,006, filed June 8, 1989, Now U.S. Pat. No. 4,934,774.

FIELD OF THE INVENTION

This invention relates to optical waveguides and methods for their manufacture.

BACKGROUND OF THE INVENTION

Planar optical waveguides are required for optical interconnection in integrated optical and optoelectronic devices. The methods used to manufacture such waveguides must be compatible with semiconductor processing methods used to manufacture other parts of the integrated devices.

Planar optical waveguides have been made by depositing a photosensitive monomer on a substrate and selectively exposing the deposited monomer to ultraviolet (UV) radiation. The UV radiation polymerizes the exposed monomer to provide polymer regions having a relatively high refractive index bounded by monomer regions having a relatively low refractive index. A further monomer layer is generally deposited over the partially polymerized layer for protection against surface flaws and contaminants which could couple light out of the polymerized regions. Unfortunately, the waveguides made by this method are unstable at the high temperatures which are used in some semiconductor processing methods. Consequently, all high temperature processing steps must be completed before the waveguides are defined. Moreover, this method generally requires two or more deposition steps.

Planar optical waveguides have also been made by depositing or growing a first layer of $SiO_2$ on a substrate, depositing a layer of $Si_3N_4$ on the first layer of $SiO_2$, depositing a second layer of $SiO_2$ on the $Si_3N_4$ layer, and selectively removing a partial thickness of the second $SiO_2$ layer in selected regions to lower the effective refractive index of the underlying $Si_3N_4$ layer in those regions. This method requires three deposition or growth steps and one etch back step, all of which must be carefully controlled for satisfactory results.

Silicon-based planar optical waveguides have also been made by depositing or growing a first layer of undoped $SiO_2$ on a substrate, depositing P-doped $SiO_2$ on the layer of undoped $SiO_2$, selectively removing regions of the P-doped $SiO_2$ layer to expose regions of the first layer of undoped $SiO_2$, and depositing a second layer of undoped $SiO_2$ on the exposed regions of the first layer of undoped $SiO_2$ and on the remaining regions of P-doped $SiO_2$. The regions of P-doped $SiO_2$ have a higher refractive index than the surrounding regions of undoped $SiO_2$. This method also requires three deposition or growth steps and one etch back step, all of which must be carefully controlled for satisfactory results.

In U.S. Pat. No. 4,585,299, Robert J. Strain discloses a method for making silica-based planar optical waveguides in which boron, phosphorus, arsenic or germanium is implanted into a silicon substrate through a first mask and the substrate is oxidized through a second mask to provide a patterned $SiO_2$ layer which incorporates the implanted dopant. The implanted dopant raises the refractive index of a central region of the $SiO_2$ layer to provide a waveguide. This patent suggests that migration of the dopant during the oxide growth may be a problem.

Silicon-based planar optical waveguides have also been made by depositing or growing a layer of $SiO_2$ on a substrate and selectively bombarding the $SiO_2$ with H or B ions to define regions having a relatively high refractive index bounded by regions having a relatively low refractive index. The implantation process causes localized compaction of the $SiO_2$ which locally increases the refractive index of the $SiO_2$. The presence of the implanted H or B ions may also modify the refractive index of the implanted $SiO_2$. Unfortunately, the $SiO_2$ is decompacted and the implanted H or B ions are redistributed by diffusion in the $SiO_2$ layer if the waveguides are subjected to subsequent high temperature processing steps. The decompaction of the $SiO_2$ and the migration of the implanted H or B ions degrades the refractive index profile defined by the implantation process. Consequently, all high temperature processing steps must be completed before the waveguides are defined.

SUMMARY OF THE INVENTION

This invention seeks to obviate or mitigate problems with known planar optical waveguides and methods for their manufacture as described above.

One aspect of the invention provides an optical waveguide comprising a substrate and a layer of $SiO_2$ on the substrate. The layer of $SiO_2$ comprises a region containing a stoichiometric excess of Si which defines a region having an elevated refractive index surrounded by a region having a lower refractive index.

Another aspect of the invention provides a method for making an optical waveguide. The method comprises the steps of forming a layer of $SiO_2$ on the substrate and implanting a region of the $SiO_2$ layer with Si ions to define a region having an elevated refractive index surrounded by a region having a lower refractive index.

The optical waveguide according to the invention is stable at the high temperatures required for many semiconductor processing methods. Sample waveguides were annealed at 1100 degrees Celsius in a non-oxidizing ambient for 12 hours without loss of definition of the refractive index profile. However, high temperature processing in an oxidizing ambient does cause loss of definition of the refractive index profile.

The method according to the invention requires only a single deposition or growth step, and no etch back step. Consequently this method is relatively simple and easy to control. Moreover, the method is compatible with standard semiconductor processing methods, and can be performed using readily available semiconductor processing equipment.

BRIEF DESCRIPTION OF THE DRAWINGS

Embodiments of the invention are described below by way of example only. The description refers to the attached drawings, in which.

DETAILED DESCRIPTION OF EMBODIMENTS

Figure 1A:
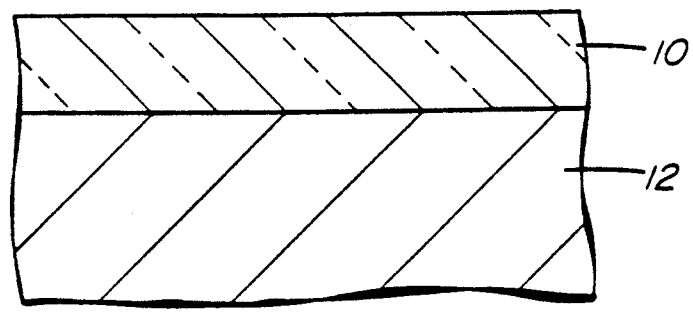
FIGS. 1a, 1b and 1c are cross-sectional views of an optical waveguide according to an embodiment of the invention at successive stages of its manufacture by a method according to a first embodiment of the invention.

In a method according to a first embodiment of the invention for making an optical waveguide, a layer 10 of $SiO_2$ is grown by steam oxidation of a <100> Si substrate 12 to form the structure shown in FIG. 1a. The steam oxidation is performed at 950 degrees Celsius and at atmospheric pressure to provide an $SiO_2$ layer 10 approximately 710 nm thick.

Figure 1B:
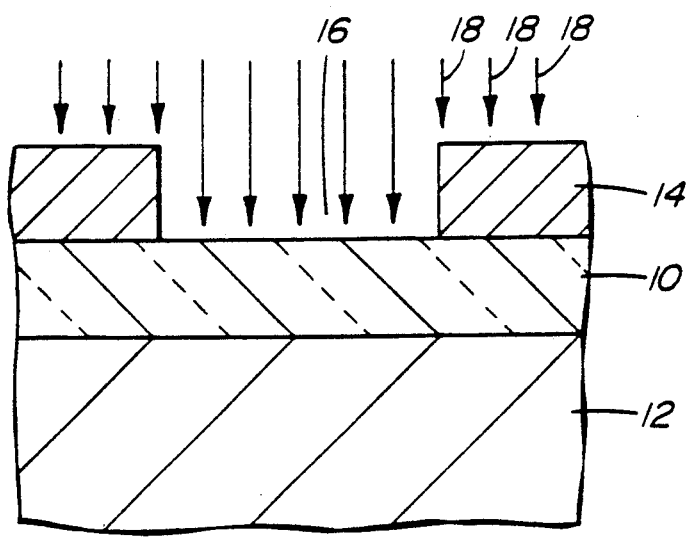

A layer 14 of $Si_3N_4$ approximately 2 microns thick is deposited on the $SiO_2$ layer, and defined using conventional photolithographic techniques to provide an opening 16 through the $Si_3N_4$ layer 14 where a waveguide channel is desired. The resulting structure, shown in FIG. 1b, is inserted into conventional ion implantation equipment, where it is subjected to a dose of Si ions 18 at an implant dose of $4 \times 10^{16}$ cm$^{-2}$ and an implantation energy of 40 keV. The $Si_3N_4$ layer 14 acts as an ion implantation mask to provide selective implantation of the Si ions 18 into the $SiO_2$ layer 14 only through the opening 16.

Figure 1C:
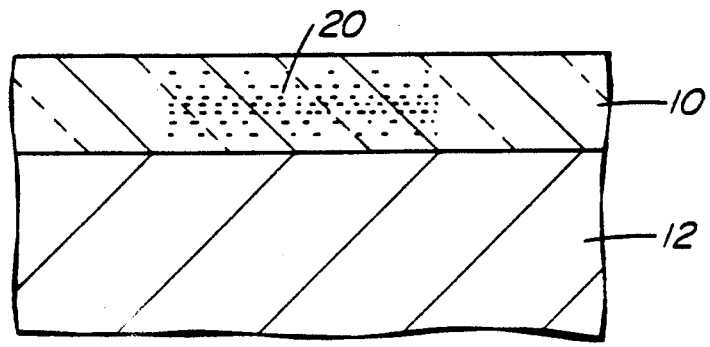

The $Si_3N_4$ layer 14 is removed using conventional techniques for the selective removal of $Si_3N_4$ to leave the layer 10 of $SiO_2$ which now comprises an implanted region 20 containing a stoichiometric excess of Si as shown in FIG. 1c. The stoichiometric excess of Si as a function of depth approximates a Gaussian distribution function. The refractive index of the implanted region 20 is elevated by the presence of the excess Si in proportion to the local concentration of the excess Si. Thus, the excess Si defines a graded refractive index profile which defines a region having an elevated refractive index surrounded by a region having a lower refractive index.

Figure 2:
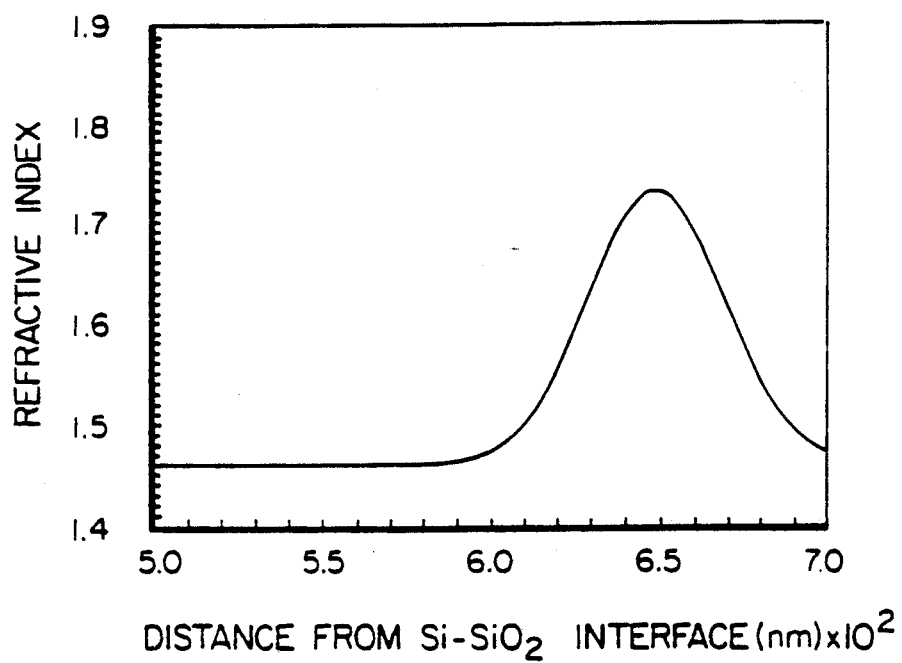
FIG. 2 is a plot of refractive index versus depth for the optical waveguide of FIG. 1.

FIG. 2 illustrates the refractive index profile of the implanted optical waveguide which may be measured using conventional etch back techniques combined with conventional ellipsometric refractive index measurements.

Waveguides made by methods similar to the method described above have been annealed in an inert ambient at 1100 degrees Celsius for 12 hours without detectable changes in the refractive index profile. These results indicate that although a minor proportion of the refractive index increase may be due to compaction of the $SiO_2$, a mechanism which is reversed at high temperatures, most of the refractive index increase must be due to a different mechanism which is stable at high temperatures. It is believed that the increased refractive index of the Si-implanted $SiO_2$ is primarily due to the formation of Si—Si bonds which are stable at high temperatures. Thus, high temperature semiconductor processing steps which are conducted in an inert ambient may follow the formation of waveguides by the above method without degradation of the waveguide structure.

However, exposure of the implanted layers to high temperature processing in an oxidizing ambient reverses the refractive index increase due to implantation, probably because the presence of excess oxygen at elevated temperatures disrupts Si—Si bonds formed during implantation to form further $SiO_2$. This effect can be used in an alternative method for making an optical waveguide as described below.

Figure 3A:
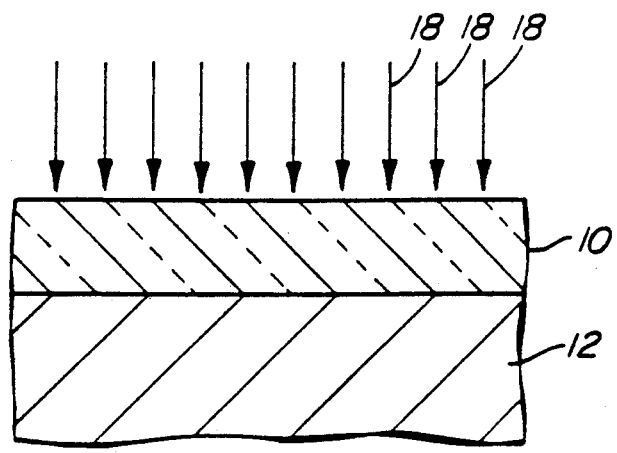
FIGS. 3a, 3b, and 3c are cross-sectional views of an optical waveguide according to an embodiment of the invention at successive stages of its manufacture by a method according to a second embodiment of the invention.
Figure 3B:
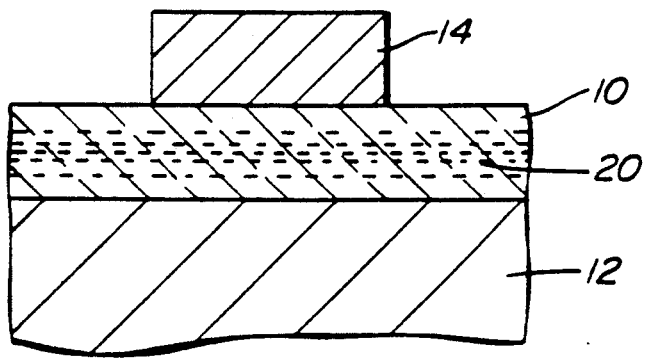
Figure 3C:
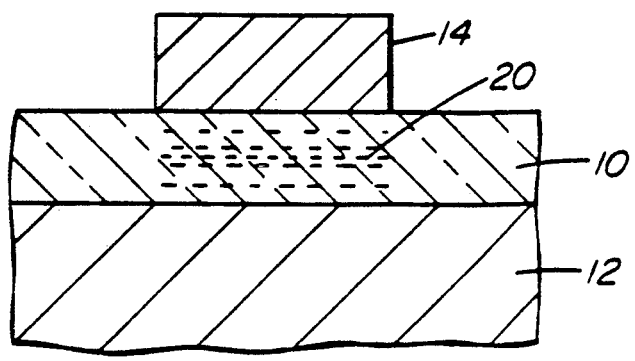

In a method according to a second embodiment, an $SiO_2$ layer 10 is grown as in the first embodiment. The implantation masking $Si_3N_4$ layer 14 of the first embodiment is omitted, and the entire $SiO_2$ layer 10 is implanted with Si ions to form a refractive index profile, as shown in FIG. 3a. A layer 14 of $Si_3N_4$ is then deposited on the $SiO_2$ layer 10 and defined using conventional photolithographic techniques so that the $Si_3N_4$ layer 14 remains only over regions of the $SiO_2$ layer 10 where a waveguide is desired, as shown in FIG. 3b. The resulting structure is then heated in an oxidizing ambient to oxidize the implanted Si in regions of the $SiO_2$ layer 10 which are not covered by the remaining $Si_3N_4$ layer 14 to erase the refractive index profile in those regions, as shown in FIG. 3c. The $Si_3N_4$ layer 14 acts as an oxidation-resistant mask to prevent oxidation of the implanted Si and erasure of the refractive index profile in the regions where a waveguide is desired.

The methods described above may be modified by growing the $SiO_2$ layer 10 on Si substrates of different orientations and at different temperatures of pressures. Pressures exceeding atmospheric pressure may be required where a thick $SiO_2$ layer is desired. The $SiO_2$ layer may be formed on Si substrates or on substrates of materials such as III–V semiconductors by processes other than thermal growth such as chemical vapour deposition.

The $SiO_2$ thickness, the implantation energy and implantation dose may be modified to change the depth and refractive index profile of the resulting waveguide. For example, the implantation energy may range from 3 keV to 400 keV, and the implantation dose may range from $1 \times 10^{14}$ cm$^{-2}$ to $2 \times 10^{17}$ cm$^{-2}$.

Non-Gaussian refractive index profiles can be obtained by performing a series of implantations at different implantation energies and optionally at different implantation doses. Successive implantations can be performed through different implantation masks to provide different refractive index profiles in different regions of the $SiO_2$ layer 10. A series of implantations through a common implantation mask can be used to provide a high refractive index well which extends to the surface of the $SiO_2$ layer 10 for surface coupling of a waveguide to an optical fiber or an optical device.

Other masking materials, such as polysilicon or Al may be used during implantation, and the thickness of the masking material should be selected to be at least three to five times the projected range of Si ions in the selected masking material at the selected implantation energy. These and other modifications are within the scope of the invention as claimed below.

We claim:

1. A method for making a planar optical waveguide, the method comprising:
   forming a layer of $SiO_2$ on a substrate;
   forming an ion implantation mask over the $SiO_2$ layer, the ion implantation mask having openings therethrough over regions of the $SiO_2$ layer where an optical waveguide channel is desired; and
   selectively implanting a region of the $SiO_2$ layer with Si ions through the openings of the ion implantation mask to define a planar optical waveguide comprising a channel region having an elevated refractive index surrounded by a region having a lower refractive index.

2. A method as defined in claim 1, wherein the step of forming a layer of $SiO_2$ on a substrate comprises growing a layer of $SiO_2$ on a Si substrate.

3. A method as defined in claim 2, wherein the step of growing a layer of $SiO_2$ on a Si substrate comprises growing a layer of $SiO_2$ on the Si substrate by steam oxidation.

4. A method as defined in claim 3, wherein the steam oxidation is performed at a pressure exceeding atmospheric pressure.

5. A method as defined in claim 1, wherein the step of forming a layer of $SiO_2$ on a substrate comprises depositing a layer of $SiO_2$ on a substrate by chemical vapour deposition.

6. A method as defined in claim 1, wherein the step of implanting a region of the $SiO_2$ layer with Si ions comprises implanting the Si ions with an implantation dose between $1 \times 10^{14}$ cm$^{-2}$ and $2 \times 10^{17}$ cm$^{-2}$ and with an implantation energy between 3 keV and 400 keV.

7. A method for making a planar optical waveguide, the method comprising:

forming a layer of $SiO_2$ on a substrate;

implanting the $SiO_2$ layer with Si ions to define a region having an elevated refractive index;

forming an oxidation-resistant mask over the regions of the implanted $SiO_2$ layer where an optical waveguide channel is desired; and heating the $SiO_2$ layer in an oxidizing ambient to oxidize the implanted Si in exposed regions of the $SiO_2$ layer to define a planar optical waveguide comprising a channel region having an elevated refractive index surrounded by a region having a lower refractive index.

8. A method as defined in claim 1, further comprising annealing the implanted $SiO_2$ layer at a temperature exceeding 1000 degrees Celsius in a non-oxidizing ambient.

9. A method as defined in claim 1, comprising performing a series of implantation steps at different implantation energies to define a non-Gaussian refractive index profile.

10. A method as defined in claim 9, wherein successive implantation steps are performed with different implantation doses.

11. A method as defined in claim 10, wherein successive implantation steps are performed through different implantation masks.

* * * * *